(12) United States Patent
Grassl et al.

(10) Patent No.: US 7,017,692 B2
(45) Date of Patent: Mar. 28, 2006

(54) DRIVETRAIN CONTROLLER FOR A MOTOR VEHICLE WITH AT LEAST TWO POWER UNITS AND A GEAR-BOX

(75) Inventors: Georg Grassl, Hainsacker (DE); Florian Gutknecht-Stöhr, Regensburg (DE); Gregor Probst, Landshut (DE); Martin Rampeltshammer, Regensburg (DE)

(73) Assignee: Siemens Aktiengesellschaft, München (DE)

( * ) Notice: Subject to any disclaimer, the term of this patent is extended or adjusted under 35 U.S.C. 154(b) by 126 days.

(21) Appl. No.: 10/381,896

(22) PCT Filed: Sep. 20, 2001

(86) PCT No.: PCT/DE01/03644

§ 371 (c)(1),
(2), (4) Date: Jun. 25, 2003

(87) PCT Pub. No.: WO02/26520

PCT Pub. Date: Apr. 4, 2002

(65) Prior Publication Data

US 2004/0035618 A1   Feb. 26, 2004

(30) Foreign Application Priority Data

Sep. 27, 2000 (DE) ............................... 100 47 906

(51) Int. Cl.
*B60K 6/02* (2006.01)

(52) U.S. Cl. ..................................... 180/65.2; 180/65.3

(58) Field of Classification Search ............... 180/65.1, 180/65.2, 65.3, 65.4, 65.6, 65.7
See application file for complete search history.

(56) References Cited

U.S. PATENT DOCUMENTS

| | | | |
|---|---|---|---|
| 5,343,970 A | 9/1994 | Severinsky | 180/65.2 |
| 5,786,640 A * | 7/1998 | Sakai et al. | 290/17 |
| 5,806,617 A * | 9/1998 | Yamaguchi | 180/65.2 |
| 6,077,186 A * | 6/2000 | Kojima et al. | 477/3 |
| 6,109,237 A | 8/2000 | Pels et al. | 123/339.19 |
| 6,112,151 A * | 8/2000 | Kruse | 701/115 |
| 6,116,363 A * | 9/2000 | Frank | 180/65.2 |
| 6,188,945 B1 | 2/2001 | Graf et al. | 701/58 |
| 6,321,143 B1 * | 11/2001 | Phillips et al. | 701/22 |
| 6,405,818 B1 * | 6/2002 | Anthony et al. | 180/65.8 |

FOREIGN PATENT DOCUMENTS

| | | |
|---|---|---|
| DE | 196 37 210 A1 | 3/1998 |
| DE | 197 04 153 A1 | 8/1998 |
| GB | 2 340 463 A | 2/2000 |

\* cited by examiner

*Primary Examiner*—Christopher P. Ellis
*Assistant Examiner*—Brian Swenson
(74) *Attorney, Agent, or Firm*—Cohen, Pontani, Lieberman & Pavane

(57) ABSTRACT

A torque set value is determined in a pedal interpretation unit (20) from a parameter which characterizes the drivers command. Operating parameters for the vehicle are evaluated and classified in a driver and situation recognition unit (21). A set operating status for the drivetrain is fixed in a status manager (22), depending upon the torque set value and the output signals from the driver and situation recognition unit. Control signals for remote control units (2, 5, 8) for the drive units and for the gearbox (7) are then generated in a torque manager (23), dependent upon the torque set value and the set operating status.

14 Claims, 4 Drawing Sheets

DRIVETRAIN CONTROLLER FOR A MOTOR VEHICLE WITH AT LEAST TWO POWER UNITS AND A GEAR-BOX

PRIORITY CLAIM

This is a national stage of PCT application No. PCT/DE01/03644, filed on Sep. 20, 2001. Priority is claimed on that application and on German Application No. 100 47 906.5 filed on Sep. 27, 2000.

BACKGROUND OF THE INVENTION

1. Field of the Invention

The invention relates to a drivetrain controller for a motor vehicle with two drive units and a gear box.

2. Description of the Prior Art

In addition to a conventional internal combustion engine, future motor vehicle generations will increasingly be equipped with at least one additional drive unit, such as an electric motor. The term "electric motor" is to be understood here and in the following description in a general sense and also includes crankshaft starter-generators—also referred to below as integrated starter-generators (ISG).

U.S. Pat. No. 6,188,945 discloses a drivetrain controller for a motor vehicle which determines the type of drive source as a function of the positions of the accelerator pedal and the brake pedal as well as of sensor signals and operating parameters of the motor vehicle.

SUMMARY OF THE INVENTION

This object is achieved according to the invention by a drivetrain controller for a motor vehicle with at least two drive units and gearbox including decentralized control units form generating setting signals for the drive units and gearbox and a pedal interpretation unit for determining a torque set value from a parameter characterizing the driver's command.

This object is achieved according to the invention by means of a drivetrain controller with the features recited in Claim 1. Further advantageous embodiments of the invention ensue from the sub-claims.

Depending on a torque set value and on signals that characterize the current operating situation of the vehicle, a set operating state for the drivetrain is specified in a status manager. Depending on the torque set value and the set operating state, control signals for decentralized control units of the drive units and the gearbox are then generated in a torque manager.

This type of hierarchical separation of the specification of the set operating state and the distribution of the torque request to the available torque sources and sinks considerably reduces the complexity of the system. As a result, the drivetrain controller is also easy to configure and can therefore be adapted to different framework conditions and requirements with little effort. It is also possible to assign different processing timeslices to the status manager and the torque manager and in this way to increase the control dynamics and influence the utilization of the processor in a targeted manner.

BRIEF DESCRIPTION OF THE DRAWINGS

An embodiment of the invention is described in the following with the aid of the drawings. In the drawings.

DETAILED DESCRIPTION OF THE PRESENTLY PREFERRED EMBODIMENTS

Figure 1:
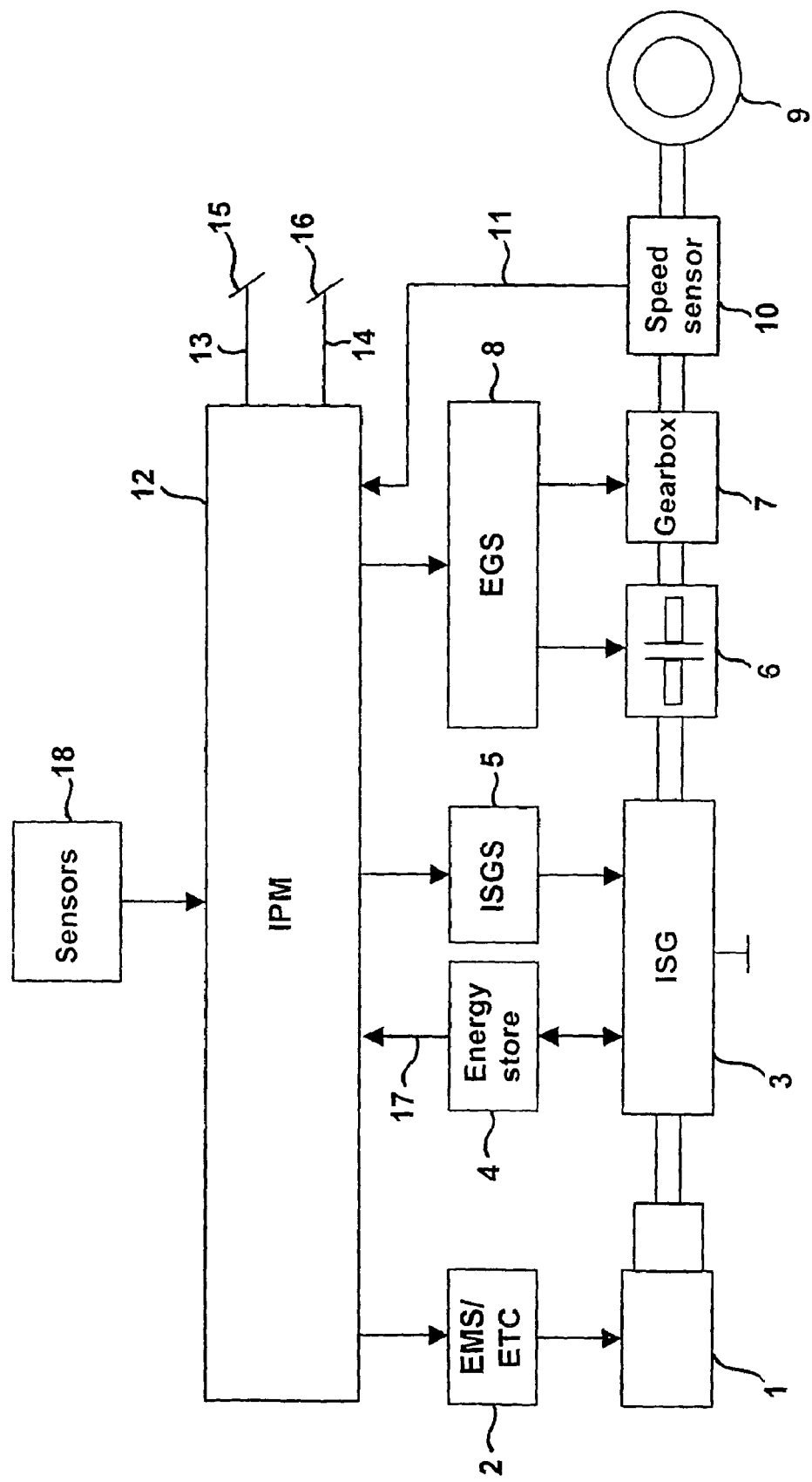
FIG. 1 is a block diagram of a drivetrain of a motor vehicle with two drive units.

The arrangement illustrated in FIG. 1 shows a drivetrain of a motor vehicle which is driven by an internal combustion engine 1, the internal combustion engine 1 being of conventional design and therefore represented only in schematic form. In this case the internal combustion engine 1 is controlled by an electronic engine management systems (EMS) 2, which can also assume the function of an electronic throttle control system (ETC). On the output side, the internal combustion engine 1 is linked via shaft to an electric motor in the form of an integrated starter-generator 3, which charges an energy store 4. The energy store 4 is advantageously implemennted as an electric battery, but can equally be implemented as a fuel cell or high-performance capacitor in the form of ultra-caps. With a stationary engine, on the other hand, the intergrated starter-generator 3 can be used to start the internal combustion engine 1. In this case intergrated starter-generator is preferably implemented as an asynchronous machine, but can also be implemented as a synchronous machine or dc motor. The intergrated starter-generator 3 is controlled by an ISG control unit (ISGS) 5.

A clutch—not shown—may be disposed between the internal combustion engine 1 and the integrated starter-generator 3, the clutch enabling the internal combustion engine 1 to be separated from the drivetrain. The clutch also allows the speed of the integrated starter-generator 3 to be disengaged from that of the internal combustion engine 1, thus causing the braking effect of the internal combustion engine 1 to be deactivated, the braking effect generating only energy loss, and the electrically usable braking effect of the starter-generator 3 to be improved.

Also disposed in the drivetrain is a clutch 6 for a gearbox 7, the clutch 6 possibly being implemented as a wet or dry clutch, for example. The clutch 6 and the gearbox 7 are controlled by an electronic gearbox controller (EGS) 8 which includes the ability to set different transmission ratios of the gearbox 7. Switching between the different transmission ratios is managed automatically by the electronic gearbox controller (EGS) 8 by means of a corresponding controller for the clutch 6 and the actuators of the gearbox 7, e.g. for the gate and shift positions when the gearbox 7 is implemented as an automated manual shift gearbox. As an alternative to a gearbox with fixed gear ratios, a gearbox with a continuously variable transmission ratio can also be used. It is also immaterial whether the gearbox 7 is implemented as a conventional automatic gearbox with a planetary gear set or as an automated (automatic) manual shift gearbox.

Furthermore, the drivetrain is linked with the wheels 9 of the motor vehicle. For reasons of clarity, only one wheel 9 is shown in the figure by way of example. Finally, there is disposed in the drivetrain a speed sensor 10, which continuously measures the current speed n of the gearbox output shaft or a similar signal, such as wheel speed or vehicle speed, and transfers the measurement via a cable 11 to an integrated drivetrain management system (IPM) 12. Further input signals are received by the drivetrain management system 12 via, for example, cables 13 and 14, said signals characterizing the driver's command relating to a drive torque and a braking torque, respectively. These signals can be acquired, for example, by evaluating the positions of the accelerator pedal 15 and the brake pedal 16. Furthermore, a signal characterizing the charge state of the energy store 4 is transferred to the drivetrain management system 12 via a cable 17. Also supplied to the drivetrain management system 12 are further signals from sensors 18, which are grouped symbolically into a block, and possibly also data from external signal sources, e.g. via GPS, thereby enabling the current operating situation to be determined.

Depending on the supplied signals, the drivetrain management system 12 performs a coordinated calculation of the central operating parameters of the drivetrain. Thus, for example, gearbox transmission ratios and set torques for the drive units, but also drive type and operating points are specified in the drivetrain management system 12. This information is supplied to the decentralized controllers or control devices 2, 5 and 8 in the form of control signals. Depending on these control signals, the controllers or control devices 2, 5 and 8 generate setting signals for the individual units or components of the drivetrain. The drivetrain management system 12 is represented in the figure as an independent control unit, but can equally be integrated with one or more of the decentralized controllers or control devices 2, 5 or 8. Similarly, the decentralized control devices 2, 5 and 8 are also represented as independent control units. However, these units, too, can also be combined in any fashion in one or more multifunctional control devices.

Figure 2:
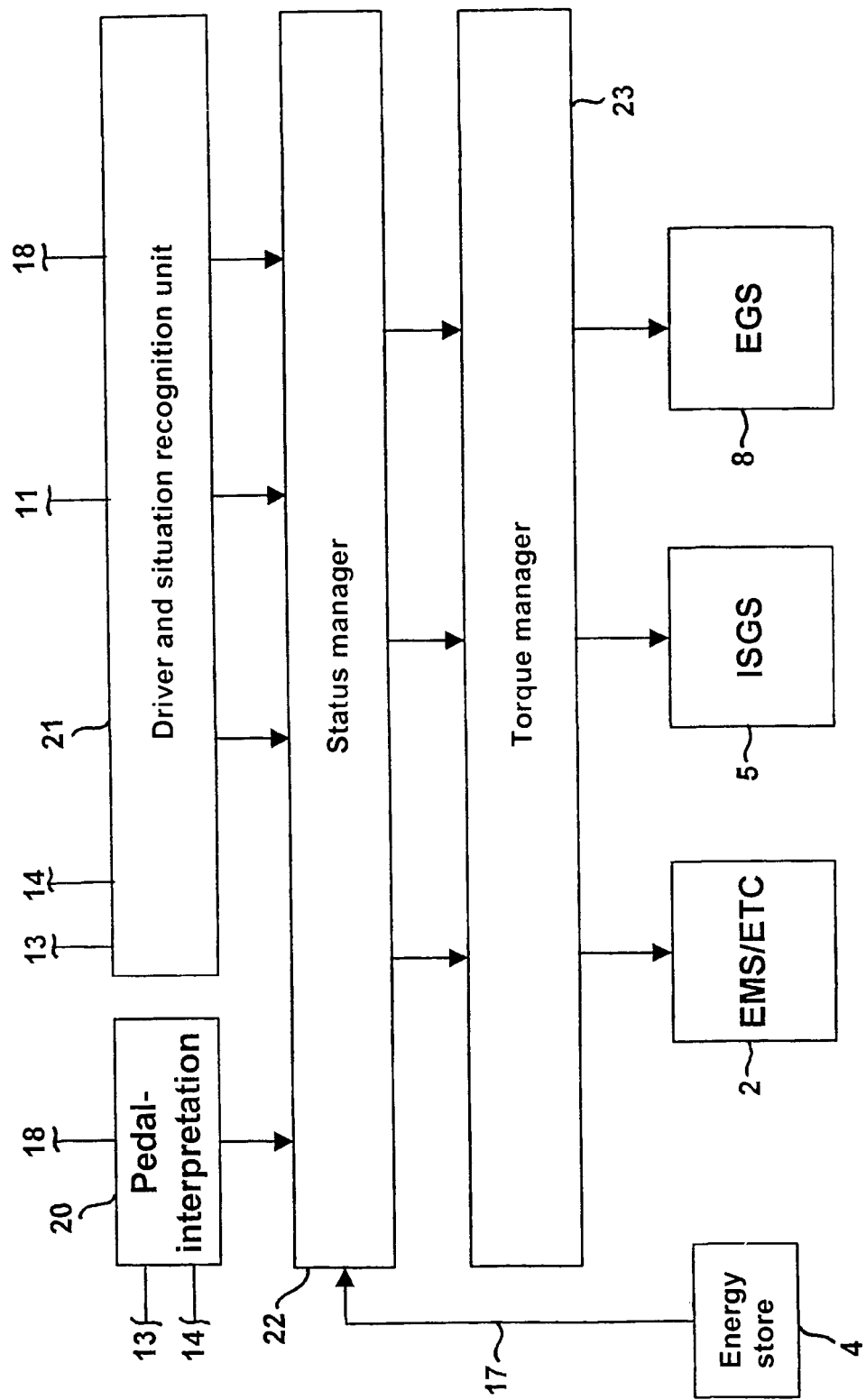
FIG. 2 is a block diagram of a drivetrain controller according to the invention.

The architecture of the drivetrain management system 12 is shown in detail in FIG. 2. A desired torque value is determined in a pedal interpretation unit 20 as a function of the signals on the cables 13 and 14. This desired torque is advantageously output as a set wheel torque, but can also be output as a set wheel longitudinal force or set torque at the gearbox input or output. Through continuous information via the brake pedal 16 and further signals from the sensors 18, it is also possible to specify negative set wheel torques or longitudinal forces. This allows integrated management of driving units, such as internal combustion engine or electric motor, or decelerating, energy-consuming units such as service brake or electrical generator. As an alternative to the desired torque specified by driver command, the desired torque can also be specified by a driving speed governor.

The output signals characterizing the operating situation and driver type are generated in a driver and situation recognition unit 21 as a function of the signals from the sensors 18 and of the speed n supplied via the cable 11 as well as possibly of other data from external signal sources. Moreover, signals characterizing the driver's command and transferred over the cables 13 and 14 can also be taken into account. Specifically, the driver and situation recognition unit can comprise the following components: a driver type recognition sensor, an environment and road type localization sensor, a driving maneuver and driving situation recognition unit, and an information channel, e.g. a radio telephone or a satellite receiver.

The set operating state of the drivetrain is specified in a status manager 22 as a function of the output signals from the driver and situation recognition unit 21 and of the signal supplied via the cable 17, which characterizes the charge state of the energy store 4. This specification of the operating states is described in greater detail below. Control signals, e.g. in the form of state variables that characterize the set operating state, are then transferred to a torque manager 23 by the status manager 22.

Depending on the set operating state, the desired torque is distributed to the available torque sources and sinks and the transmission ratio of the gearbox is specified. Here, the desired torque is distributed such that a control signal that characterizes the required torque of the respective drive unit is transferred by the torque manager 23 to the decentralized control units 2 and 5. Analogously, a control signal that characterizes the gear to be selected or the gearbox transmission ratio to be set, as well as the degree of opening of the clutch 6 if applicable, is transferred to the gearbox controller 8.

Figure 3:
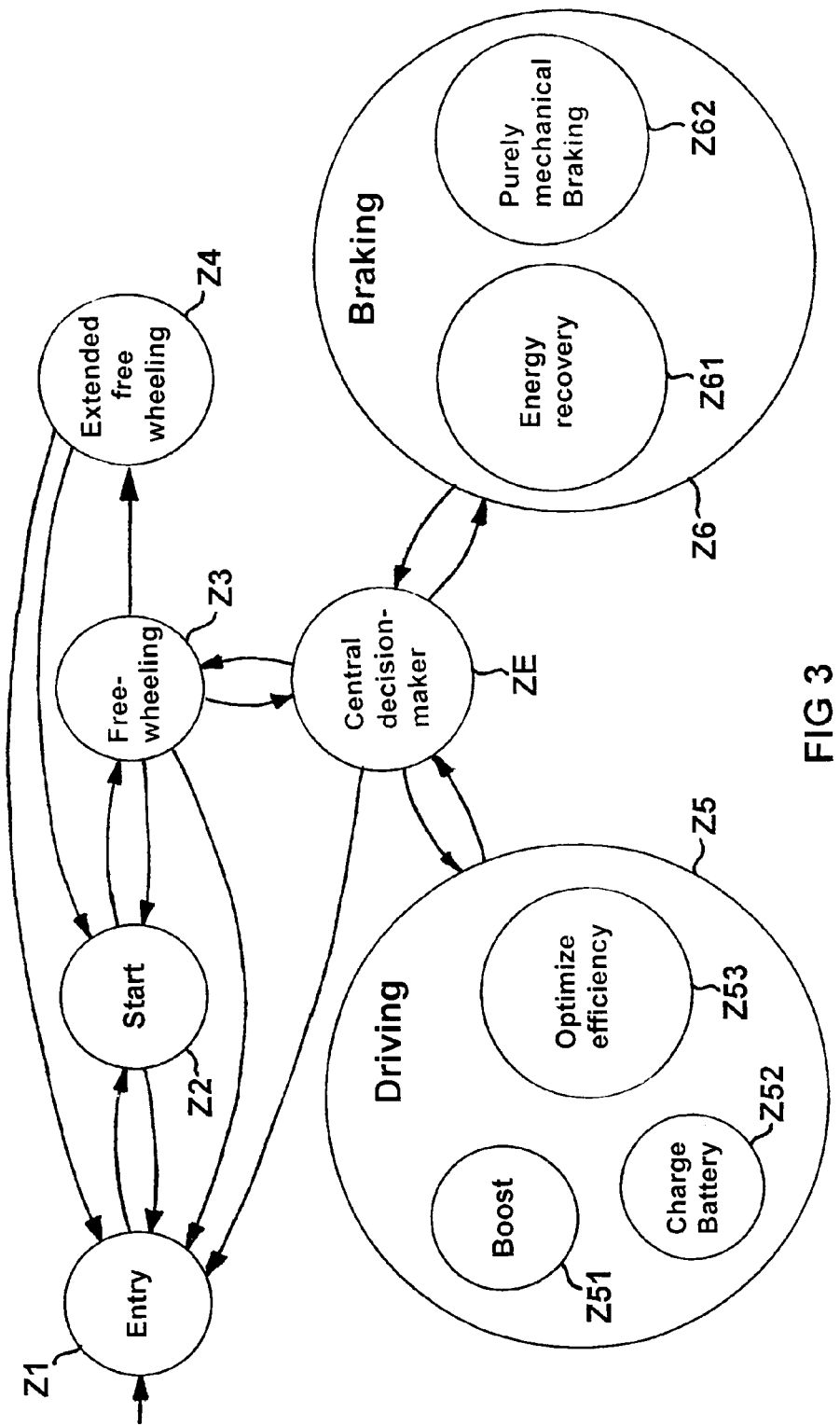
FIG. 3 is a state diagram of the possible states of the drivetrain as shown in FIG. 1.

The functionality of the status manager 22 is explained below with the aid of a state transition diagram (FIG. 3). A plurality of possible set operating states for a drivetrain are stored in the status manager 22. The actual operating states possible in a specific motor vehicle and the possible state transitions are dependent here on the configuration of the drivetrain (i.e., the type and number of components or units present in this motor vehicle. In order to be able to use a status manager 22 according to the invention for different vehicle types and hence for differently configured drivetrains, the status manager 22 advantageously provides a configuration recognizer, e.g. in the form of data bits, which is set according to the configuration of the drivetrain. Individual states can then be inhibited or released, depending on the configuration recognizer. Possible states and state transitions for a drivetrain as illustrated in FIG. 1 are shown in FIG. 3 as an example. In this, the following operating states of the drivetrain are distinguished in the status manager 22:

Z1: The "entry" state is assumed immediately after the ignition is switched on.

Z2: In the "start" state, the combustion engine 1 is started via the integrated starter-generator 3. To this end, a starting speed request is transferred to the ISG control unit 5 by the torque manager 23 with clutch 6 open. The ISG control unit 5 in turn controls the integrated starter-generator 3 such that a corresponding torque is created. After overcoming the breakaway torque, the combustion engine 1 is accelerated by the integrated starter-generator 3 until a starting speed is reached. The start operation is finally completed by a feedback message sent by the engine management system 2 to the drivetrain management system 12 confirming that the idling speed has been reached. Alternatively, the start operation can also be controlled via a direct torque specification to the starter-generator 3. The engine start with the aid of the integrated starter-generator 3 is considerably faster and quieter than is possible with a conventional starter.

Z3: In the "freewheeling" state, the clutch 6 is opened or remains open and the combustion engine 1 continues running in idle mode. Particularly when an internal combustion engine with a conventional drivetrain is operating in coasting mode, "freewheeling mode" has great advantages. With a conventional drivetrain, when the combustion engine 1 is operating in coasting mode, corresponding energy losses occur due to the friction torque of the combustion engine 1, said energy losses increasing at higher speeds. By opening the clutch 6 in "freewheeling mode", it is possible to avoid the vehicle deceleration effect resulting from the power loss of the internal combustion engine 1. Thus, if neither the accelerator pedal 15 nor the brake pedal 16 is depressed, the "freewheeling mode" is activated, and subsequently exited again by depressing the accelerator pedal 15 or the brake pedal 16.

Z4: In the "extended freewheeling" state, which can only be reached from the "freewheeling" state, the combustion engine 1 is also switched off in addition to the clutch 6 being opened. In this case, it must however be ensured that safety units, such as power brakes and power steering, and comfort units, such as an air conditioning system, are either electrically operated or at least monitored in respect of their operational readiness so that the combustion engine 1 can be restarted promptly when necessary.

Figure 4:
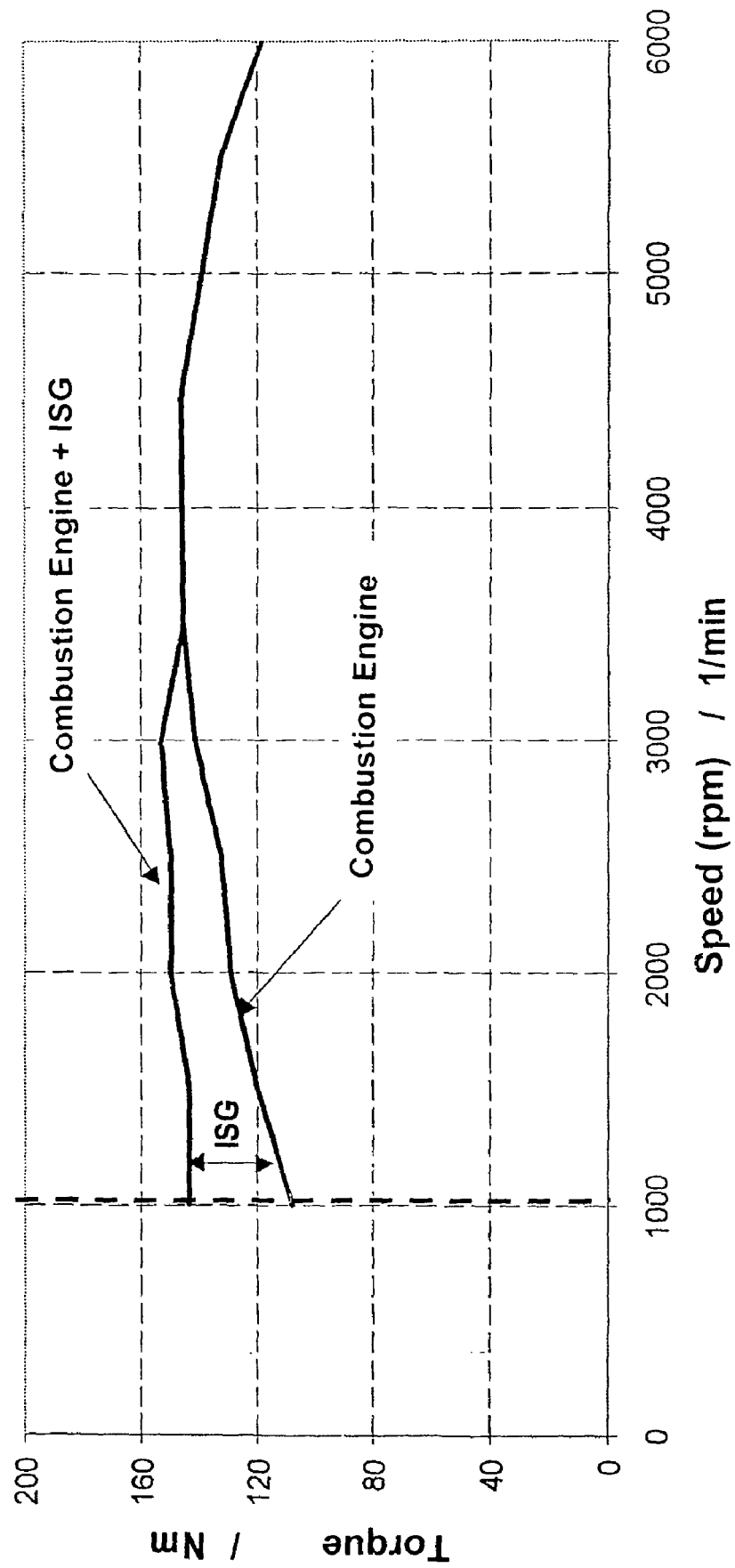
FIG. 4 is a chart plotting the torque of a combustion engine with and without integrated starter-generator.

Z5: In the example embodiment, the "drive" state consists of a total of three sub-states that describe the driving situation more precisely:

Z51: In the "boost" state, the integrated starter-generator 3 is operated as an electric motor in order to support the combustion engine 1 and can thus introduce an additional torque into the gearbox 7 via the clutch 6. In this case the torque characteristics of the combustion engine 1 and the integrated starter-generator 3 complement each other in the low speed range such that (FIG. 4) improved traction values can be realized. Conversely, however, it would also be possible to use a combustion engine 1 with a smaller cubic piston displacement without sacrificing traction at low speeds.

Z52: In the "charge battery" state, the integrated starter-generator 3 is operated as a generator and assumes the function of a conventional dynamo, i.e. in this state it serves to charge the energy store 4. During an active shift operation or a change to the gearbox transmission ratio, the load torque can be reduced to 0 Nm in the process, with the result that ease of shifting is not adversely affected.

Z53: In the "optimize efficiency" state, the operating point of the combustion engine 1 is actively shifted to an optimal operating point in order to improve engine efficiency. In other words, contrary to the driver's original desired torque, the combustion engine 1 is operated at higher or lower mean effective pressure with better specific consumption. If there is a shift e.g. to a higher combustion engine torque, the excess torque is taken up by the integrated starter-generator 3, converted into electricity and stored in the energy store 4. In this case the amplitude of the shift in operating point is limited by the maximum torque of the integrated starter-generator 3, and the duration of the operating point shift by the charge capacity of the energy store 4. Of course, the efficiency of the individual components must also be taken into account here.

Z6: In the example embodiment, the "braking" state likewise consists of two sub-states that characterize braking more precisely:

Z61: In the "energy recovery" state, the energy store 4 is charged by means of recuperative braking via the integrated starter-generator 3. A prerequisite for this is, of course, that the energy store 4 used possesses feedback capability and can accept charge, i.e. is not fully charged. If a clutch—not shown in FIG. 1—is disposed between the internal combustion engine 1 and the integrated starter-generator 3 which enables the internal combustion engine 1 to be disengaged from the drivetrain, this will advantageously be opened or remain open.

Z62: In the "purely mechanical braking" state, recuperative braking is not used and so no energy is recovered via the integrated starter-generator 3. If a clutch —not shown in FIG. 1—is disposed between the internal combustion engine 1 and the integrated starter-generator 3 which enables the internal combustion engine 1 to be disengaged from the drivetrain, this will advantageously be or remain closed.

Possible state transitions are indicated in FIG. 3 by an arrow pointing in the appropriate direction. Within the main states "driving" and "braking", corresponding arrows have been omitted for reasons of clarity. However, it is possible to switch arbitrarily between the relevant sub-states. Each change of state is, however, linked to the fulfillment of predefined transition conditions. Switching between the states Z3 "freewheeling" and the main states Z5 "driving" and Z6 "braking" is advantageously possible only via a central decision-maker ZE and is dependent particularly on the signals characterizing the driver's command on the cables 13 and 14.

As already mentioned, it is considerably faster and quieter to start the combustion engine 1 with the aid of an integrated starter-generator 3 than is possible with a conventional starter. Furthermore, the start operation is largely free of wear and tear for the integrated starter-generator 3. As long as the energy store 4 can provide sufficient energy for the next start operation, there is therefore the possibility to switch off the combustion engine 1 from within the "freewheeling" mode, particularly during stop phases of the motor vehicle. In order to start the combustion engine 1 promptly again when necessary, however, great importance is attached to the transition from the "extended freewheeling" to the "start" state. Possible transition conditions for switching from the "extended freewheeling" to the "start" state are specified below as an example.

The set operating state of the drivetrain switches from state Z4 "extended freewheeling" to the state Z2 "start" as a function of a) The Position of the Accelerator Pedal 15:
When a positive torque command from the driver, generated by depression of the accelerator pedal 15, is transferred to the status manager 22, the set operating state of the drivetrain switches to the "start" state.

b) The Position of the Brake Pedal 16:
When the brake pedal 16 is no longer depressed, such that a negative torque command from the driver is no longer present, this is interpreted by the torque manager 23 as an indication that a positive torque command is to be expected shortly. The set operating state of the drivetrain is therefore put into the "start" state as a precaution.

c) The Position of the Selector Lever:
When the selector lever for the gear stage or the gearbox transmission ratio is moved from the neutral position by the driver, the set operating state of the drivetrain switches to the "start" state.

d) The Vacuum in the Power Brake:
If the vacuum in the power brake falls below a predefined threshold value, the set operating state of the drivetrain switches to the "start" state in order to ensure the continued operational readiness of the power brake. As an alternative to the immediate evaluation of the vacuum in the power brake, the number and/or duration of brake pedal actuations can also be evaluated. If the total braking time exceeds a predefined threshold value, the set operating state is likewise set to the "start" state.

e) The Charge State of the Energy Store:
If the charge state of the energy store 4 falls below a predefined threshold value, the set operating state of the drivetrain switches to the "start" state in order to ensure that the energy store 4 can still provide sufficient energy for the next start operation and is recharged.

f) The Charge State of the Energy Store and the Topology of the Route Traveled:

If the charge state of the energy store 4 exceeds a predefined threshold value and a gradient section is recognized by the driver and situation recognition unit, the set operating state is likewise put into the "start" state in order to take advantage of the braking effect of the combustion engine 1.

Analogously to the transition conditions described for a change of state from "extended freewheeling" to "start", transition conditions are defined for each possible state change as a function of the input signals of the status manager 22. Thus, for example, a switch to the "boost" operating mode will be dependent on the current torque command, the driver type, the charge state of the energy store, and possibly the speed. Due to the power of the integrated starter-generator 3, the switch from the "entry" state to the "start" state will be permissible only when the clutch 6 is open, the combustion engine 1 is switched off and the brake pedal 16 is depressed. By suitable selection of the transition conditions it is also possible to specify that the drivetrain initially switches to the battery charge state Z52 after each start operation in order to ensure that the energy store 4 is charged. By means of simple extensions to the transition condition, a switch to this state can, however, be prevented if the energy store 4 is already sufficiently charged or if either a very high torque or no torque is requested by the driver. In these cases it is possible to switch instead to the "boost" mode or to remain in the "freewheeling" mode.

The transition conditions described are to be taken merely as an example, but clearly demonstrate the easy and versatile configurability of the drivetrain controller according to the invention.

For safety reasons it makes sense to provide an "emergency drive program" in the status manager 22 as well. A switch to this state is initiated whenever a malfunction is detected in the drivetrain. The vehicle can then, for example, be slowed down in a controlled manner by braking until stationary and then the combustion engine 1 can be switched off.

The invention was described for a motor vehicle with two drive units in the form of an internal combustion engine and an integrated starter-generator as an example. The integrated starter-generator, which on the one hand assumes the function of a starter with secondary gearbox and on the other hand takes on the function of a separate dynamo for charging the vehicle battery, should be seen here merely as a special form of an electric motor. However, the application of the invention is in no way limited by the type of drive units. Similarly, the invention can also be used for motor vehicles with more than two drive units.

What is claimed is:

1. A drivetrain controller for a motor vehicle, the motor vehicle including an energy store and a drivetrain having two drive units and a gearbox, said drivetrain controller comprising:

decentralized control units for generating setting signals for the two drive units and the gearbox of the drivetrain;

a pedal interpretation unit for receiving a driver command parameter characterizing a driver's command and determining a torque set value in response to the driver command parameter;

a status manager having a plurality of stored set operating states for the drivetrain, each of said plurality of stored set operating states being associated with control signals characterizing said each of said plurality of stored set operating states, said status manager receiving a signal indicating a charge state of the energy store and being connected to said pedal interpretation unit for selecting a selected set operating state from said plurality of set operating states for the drivetrain in response to the torque set value and the charge state of the energy store; and a torque manager connected to said status manager and said pedal interpretation unit for controlling each of the decentralized control units in response to the torque set value and the control signals associated with the selected set operating state for the drivetrain.

2. The drivetrain controller of claim 1, further comprising a driver and situation recognition unit for evaluating and classifying operating parameters of the vehicle, said status manager connected to the driver and situation recognition unit wherein said status manager selects the selected set operating state of the drivetrain in response to the torque set value, the charger state of the energy store, and the output signals of the driver and situation recognition unit.

3. The drivetrain controller of claim 1, wherein said status manager further comprises a configuration recognizer arranged and dimensioned for detecting a configuration of the drivetrain and generating a signal in accordance with the detected configuration of the drive train, said status manager inhibiting or releasing a subset of said plurality of set operating states of the drivetrain from being selected in response to the configuration recognizer.

4. The drivetrain controller of claim 1, wherein said decentralized control units generate setting signals for an internal combustion engine and an electric motor.

5. The drivetrain controller of claim 4, wherein the drivetrain of the motor vehicle includes a clutch, a first operating state of said plurality of set operating states comprising a "freewheeling" set operating state, the decentralized control units generating a setting signal to open the clutch in the drivetrain of the motor vehicle in the "freewheeling" set operating state.

6. The drivetrain controller of claim 5, wherein a second operating state of said plurality of set operating states comprises an "extended freewheeling" set operating state, the decentralized control units generating a setting signal to switch off the internal combustion engine in the "extended freewheeling" set operating state.

7. The drivetrain controller of claim 4, a first operating state of said plurality of set operating states comprises a "start" set operating state, the decentralized control units generating a setting signal to start the internal combustion engine in the "start" set operating state.

8. The drivetrain controller of claim 7, wherein the drivetrain of the motor vehicle includes a clutch, a second operating state of said plurality of set operating states comprising a "freewheeling" set operating state, the decentralized control units generating a setting signal to open the clutch in the drivetrain of the motor vehicle in the "freewheeling" set operating state.

9. The drivetrain controller of claim 8, wherein a third operating state of said plurality of set operating states comprises an "extended freewheeling" set operating state, the decentralized control units generating a setting signal to switch off the internal combustion engine in the "extended freewheeling" set operating state.

10. The drivetrain controller of claim 9, wherein the motor vehicle includes an accelerator pedal, said status manager comprising means for initiating a switch from the "extended freewheeling" set operating state to the "start" set operating state in response to a depression of the accelerator pedal.

11. The drivetrain controller of claim 9, wherein the motor vehicle includes a brake pedal, said status manager comprising means for initiating a switch from the "extended freewheeling" set operating state to the "start" set operating state in response to a release of the brake pedal.

12. The drivetrain controller of claim 9, wherein the motor vehicle includes a selector lever for the gearbox having a neutral position and at least one other position, said status manager comprising means for initiating a switch from the "extended freewheeling" set operating state to the "start" set operating state in response to movement of the selector lever from the neutral position.

13. The drivetrain controller of claim 9, wherein said status manager comprises means for initiating a switch from the "extended freewheeling" set operating state to the "start" set operating state when the charge state of the energy store falls below a threshold value.

14. The drivetrain controller of claim 9, further comprising a driver and situation recognition unit for evaluating and classifying operating parameters of the vehicle including a topology of the route being traveled, wherein said status manager comprises means for initiating a switch from the "extended freewheeling" set operating state to the "start" set operating state in response to the charge state of the energy store and the topology of the route being traveled.

* * * * *